US011609831B2

(12) United States Patent
Mantri et al.

(10) Patent No.: US 11,609,831 B2
(45) Date of Patent: Mar. 21, 2023

(54) VIRTUAL MACHINE CONFIGURATION UPDATE TECHNIQUE IN A DISASTER RECOVERY ENVIRONMENT

(71) Applicant: Nutanix, Inc., San Jose, CA (US)

(72) Inventors: Hemanth Kumar Mantri, Fremont, CA (US); Igor Grobman, San Jose, CA (US); Raymond Wai-Man Yip, Cupertino, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/180,512

(22) Filed: Feb. 19, 2021

(65) Prior Publication Data

US 2022/0269571 A1   Aug. 25, 2022

(51) Int. Cl.
*G06F 11/20* (2006.01)
*G06F 11/14* (2006.01)
*G06F 9/455* (2018.01)
*G06F 9/50* (2006.01)

(52) U.S. Cl.
CPC ........ *G06F 11/2023* (2013.01); *G06F 9/5044* (2013.01); *G06F 11/1484* (2013.01); *G06F 2009/4557* (2013.01); *G06F 2201/815* (2013.01)

(58) Field of Classification Search
CPC ............. G06F 11/1484; G06F 11/2023; G06F 11/2025; G06F 11/2028; G06F 11/203; G06F 11/2041; G06F 11/3442; G06F 2201/805; G06F 9/4856; G06F 9/5044; G06F 9/5088; G06F 2009/4557; G06F 2201/815
See application file for complete search history.

(56) References Cited

U.S. PATENT DOCUMENTS

| 7,577,959 B2 | 8/2009 | Nguyen et al. |
| 8,549,518 B1 | 10/2013 | Aron et al. |
| 8,601,473 B1 | 12/2013 | Aron et al. |

(Continued)

OTHER PUBLICATIONS

Cano, Ignacio, "Curator: Self-Managing Storage for Enterprise Clusters" University of Washington; published Mar. 2017; pp. all.

(Continued)

*Primary Examiner* — Bryce P Bonzo
*Assistant Examiner* — Albert Li
(74) *Attorney, Agent, or Firm* — Cesari and McKenna, LLP

(57) ABSTRACT

A resource matching technique between a primary site and one or more secondary sites accommodates a configuration update of a virtual machine (VM) in a disaster recovery (DR) environment. The resource matching technique determines whether a proposed resource configuration update or change to a primary VM running at the primary site is permissible on a secondary VM configured for failover operation at a secondary site in the event of failure to the primary VM. The technique continuously monitors the availability of resources at each secondary site and enables negotiation between the primary and secondary sites of the proposed configuration change based on corresponding indications resource availability. The resources may include generic resources (e.g., memory, storage capacity and CPU processing capacity) and specialized resources (e.g., GPU types and/or models).

39 Claims, 5 Drawing Sheets

(56) References Cited

U.S. PATENT DOCUMENTS

| | | | |
|---|---|---|---|
| 8,776,050 | B2 | 7/2014 | Plouffe et al. |
| 8,850,130 | B1 | 9/2014 | Aron et al. |
| 8,863,124 | B1 | 10/2014 | Aron et al. |
| 9,009,106 | B1 | 4/2015 | Aron et al. |
| 9,069,708 | B2 | 6/2015 | Gill et al. |
| 9,336,132 | B1 | 5/2016 | Aron et al. |
| 9,600,380 | B2 | 3/2017 | Mizuno et al. |
| 9,652,265 | B1 | 5/2017 | Narayanasamy et al. |
| 9,747,287 | B1 | 8/2017 | Bhardwaj et al. |
| 9,772,866 | B1 | 9/2017 | Aron et al. |
| 10,228,962 | B2 | 3/2019 | Dornemann et al. |
| 2005/0132379 | A1* | 6/2005 | Sankaran ............... G06F 9/5027 714/E11.073 |
| 2015/0040127 | A1* | 2/2015 | Dippenaar ............ G06F 9/4856 718/1 |
| 2015/0271092 | A1* | 9/2015 | Ward, Jr. ................ H04L 47/72 709/226 |
| 2015/0277951 | A1* | 10/2015 | Sundararaman .... G06F 12/0802 718/1 |
| 2016/0203064 | A1* | 7/2016 | Ren ..................... G06F 9/45558 714/4.12 |
| 2016/0350013 | A1 | 12/2016 | Aron et al. |
| 2017/0068557 | A1* | 3/2017 | Cropper ............... G06F 9/45558 |
| 2018/0137019 | A1* | 5/2018 | Grobman .............. G06F 11/203 |
| 2018/0165166 | A1* | 6/2018 | Wang ................... G06F 11/2033 |
| 2020/0409806 | A1* | 12/2020 | K ........................... G06F 9/5077 |
| 2021/0124602 | A1* | 4/2021 | Tsirkin .................. G06F 9/5077 |
| 2021/0303422 | A1* | 9/2021 | Dye ..................... G06F 11/2025 |
| 2021/0314418 | A1* | 10/2021 | Abdul Wahab ....... G06F 9/5088 |
| 2022/0188042 | A1 | 6/2022 | Tatiparthi et al. |
| 2022/0217204 | A1 | 7/2022 | Tatiparthi et al. |
| 2022/0244856 | A1 | 8/2022 | Kataria et al. |
| 2022/0253243 | A1 | 8/2022 | Kataria et al. |

OTHER PUBLICATIONS

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible" from https://nutanixbible.com/ Sep. 17, 2019 pp. all.

Citrix XenDesktop 7.1 on Microsoft Hyper-V Server 2012 R2 on Nutanix Virtual Computing Platform Solution Design Citrix Validated Solutions, Jun. 25, 2014, 95 pages.

* cited by examiner

VIRTUAL MACHINE CONFIGURATION UPDATE TECHNIQUE IN A DISASTER RECOVERY ENVIRONMENT

BACKGROUND

Technical Field

The present disclosure relates to virtual machines (VMs) and, more specifically, to configuration update of a VM in a disaster recovery (DR) environment.

Background Information

A virtual machine (VM) may refer to a specific software-based implementation of a physical machine, such as a physical computer, and its associated hardware resources in a virtualization environment. The hardware resources of the physical computer may be virtualized or transformed into underlying support for a fully functional V M that can execute (run) its own operating system and applications on the underlying hardware resources similar to a physical computer. The hardware resources may include generic resources, such as central processing unit (CPU), memory, and network among others.

A plurality of physical computers or nodes may be interconnected as a cluster. To prevent data loss and interruption of service in the event of a failure to one or more nodes of a cluster, a VM running on the failed node may be configured for failover to a failover node running on another cluster. However, complete failover/recovery of the VM is only possible if the failover node at the other cluster has sufficient resources to resume operations in an adequate configuration to execute the VM. Yet, idling of resources dedicated to handling failover is typically discouraged because of unpredictable and varying demand (load) on any cluster that may be tasked to failover the VM, especially as resource requirements of the VM are changed. As such, there is a need to handle cross-cluster VM failover that accommodates changing VM resource requirements in the face of varying load.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
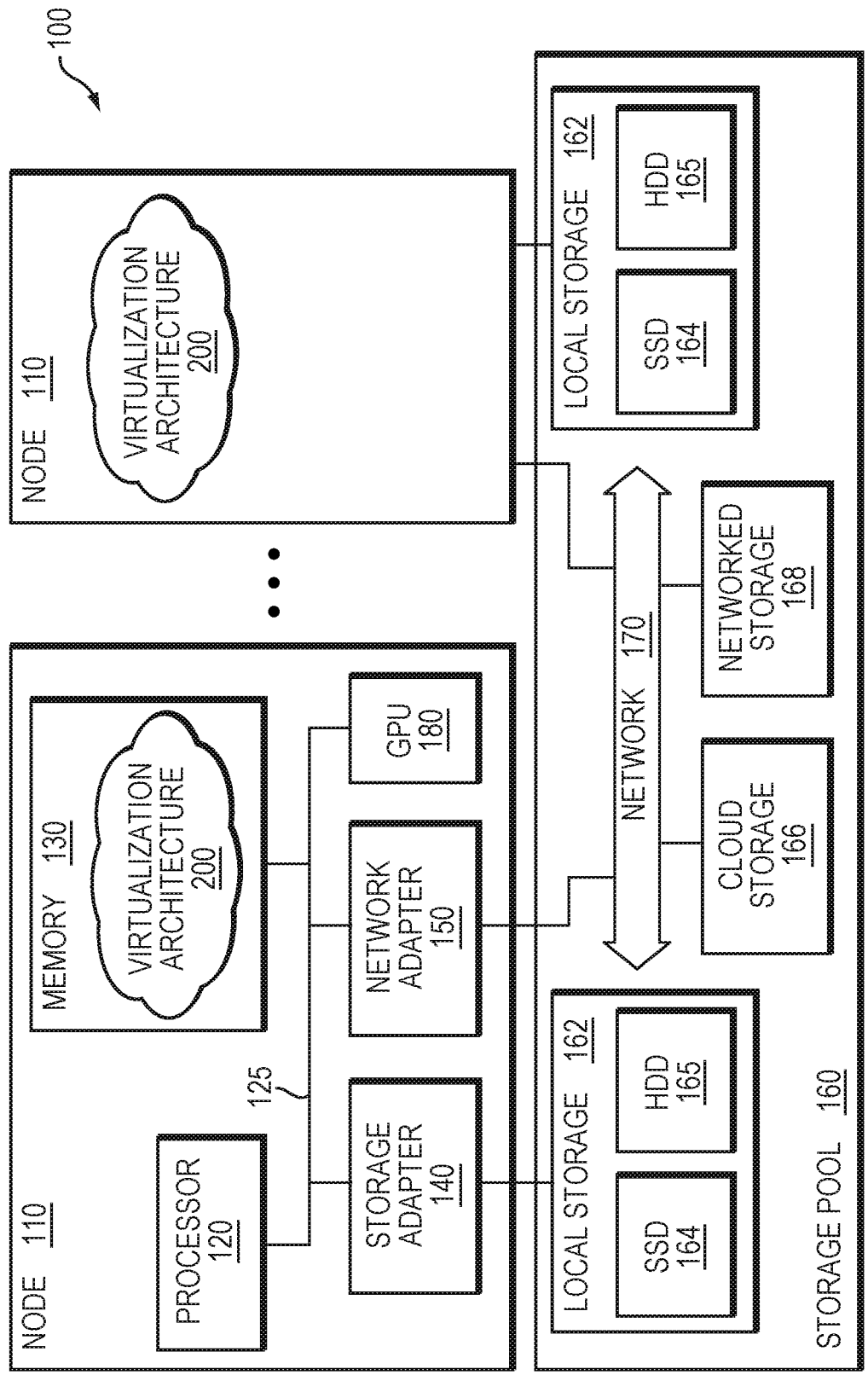
FIG. 1 is a block diagram of a plurality of nodes interconnected as a cluster in a virtualized environment.

The embodiments described herein are directed to a resource matching technique between a primary site and one or more secondary sites to accommodate a configuration update of a virtual machine (VM) in a disaster recovery (DR) environment. Specifically, the resource matching technique determines whether a proposed resource configuration update or change to a primary VM running at the primary site is permissible on a secondary VM configured for failover operation according to the proposed updated resource configuration at the secondary sites in the event that the primary VM fails. To that end, the technique continuously monitors the availability of resources at each secondary site as resource demand varies and enables negotiation between the primary and secondary sites of the proposed configuration change based on corresponding indications or capabilities of available resources that may vary unpredictably, e.g., according to dynamic load demand and local configuration changes. Illustratively, the resources may include generic resources (e.g., memory, storage capacity and CPU processing capacity) and specialized resources (e.g., graphics processing unit types and/or models).

In an embodiment, such site-to-site (i.e., peer-to-peer) resource availability monitoring may be extended to additional consideration associated with resource deployment in the event of DR failover such as (i) the type and criticality of the deployable resources at a site, (ii) rendering of decisions to deploy those resources, (iii) the dynamic nature of actual deployment of those resources; and/or (iv) a messaging protocol employed to convey resource utilization and availability at the sites so as to ascertain one or more sites suitable for failover. Notably the messaging protocol to convey (i.e., exchange) resource utilization and availability may occur on-demand (i.e., in response to a proposed VM configuration change) or at periodic intervals and may manifest as push or pull communications (i.e., sent without specific request or in response to a request).

Before implementing the proposed resource configuration change, the technique determines whether the proposed change to the primary VM running at the primary site is permissible on the secondary sites (i.e., sufficient resources are available on a respective secondary site to support a failover of the VM). If and only if it is permissible for at least one secondary site (or a specified secondary site for the proposed change), the proposed configuration change is allowed to take place. Otherwise, the proposed configuration change is temporarily suspended (i.e., provisionally rejected) along with a message indicating (suggesting) resource capabilities that each secondary site can support. Alternatively, the proposed configuration changes may be automatically retried at a next resource negotiation between the primary and secondary sites until the configuration change succeeds (due to load change reducing resource demand at the secondary sites) or is administratively removed.

Advantageously, the resource matching technique enables no loss failover and recovery of a primary VM at a primary site to a secondary VM at a secondary site by ensuring availability of resources deployed at the secondary site(s) to accommodate a configuration update (i.e., change) to the primary VM. Unlike previous attempts at no loss failover that typically consider memory, storage and CPU headroom requirements alone to achieve an aggregate "best-effort" failover node/site configuration, the technique described herein considers particular resource availability and deployment for each proposed configuration change to the primary VM to support failover.

DESCRIPTION

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. In an embodiment, the node 100 may include one or more specialized hardware resources, such as graphics processing units (GPUs) 180, configured to provide accelerated, multi-dimensional processing of tasks. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network, which is illustratively an Ethernet local area network (LAN) 170. The network adapter 150 may thus be embodied as a network interface card having the mechanical, electrical and signaling circuitry needed to connect the node 110 to the LAN. In an embodiment, one or more intermediate stations (e.g., a network switch, router, or virtual private network gateway) may interconnect the LAN with network segments organized as a wide area network (WAN) to enable communication between the cluster 100 and a remote cluster over the LAN and WAN (hereinafter "network") as described further herein. The multiple tiers of SOCS include storage that is accessible through the network, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. Communication over the network may be effected by exchanging discrete frames or packets of data according to protocols, such as the Transmission Control Protocol/Internet Protocol (TCP/IP) and the OpenID Connect (OIDC) protocol, although other protocols, such as the User Datagram Protocol (UDP) and the HyperText Transfer Protocol Secure (HTTPS) may also be advantageously employed.

The main memory 130 includes a plurality of memory locations addressable by the processor 120 and/or adapters for storing software code (e.g., processes and/or services) and data structures associated with the embodiments described herein. The processor and adapters may, in turn, include processing elements, e.g., implemented as central processing units (CPUs) and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements (CPUs) and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
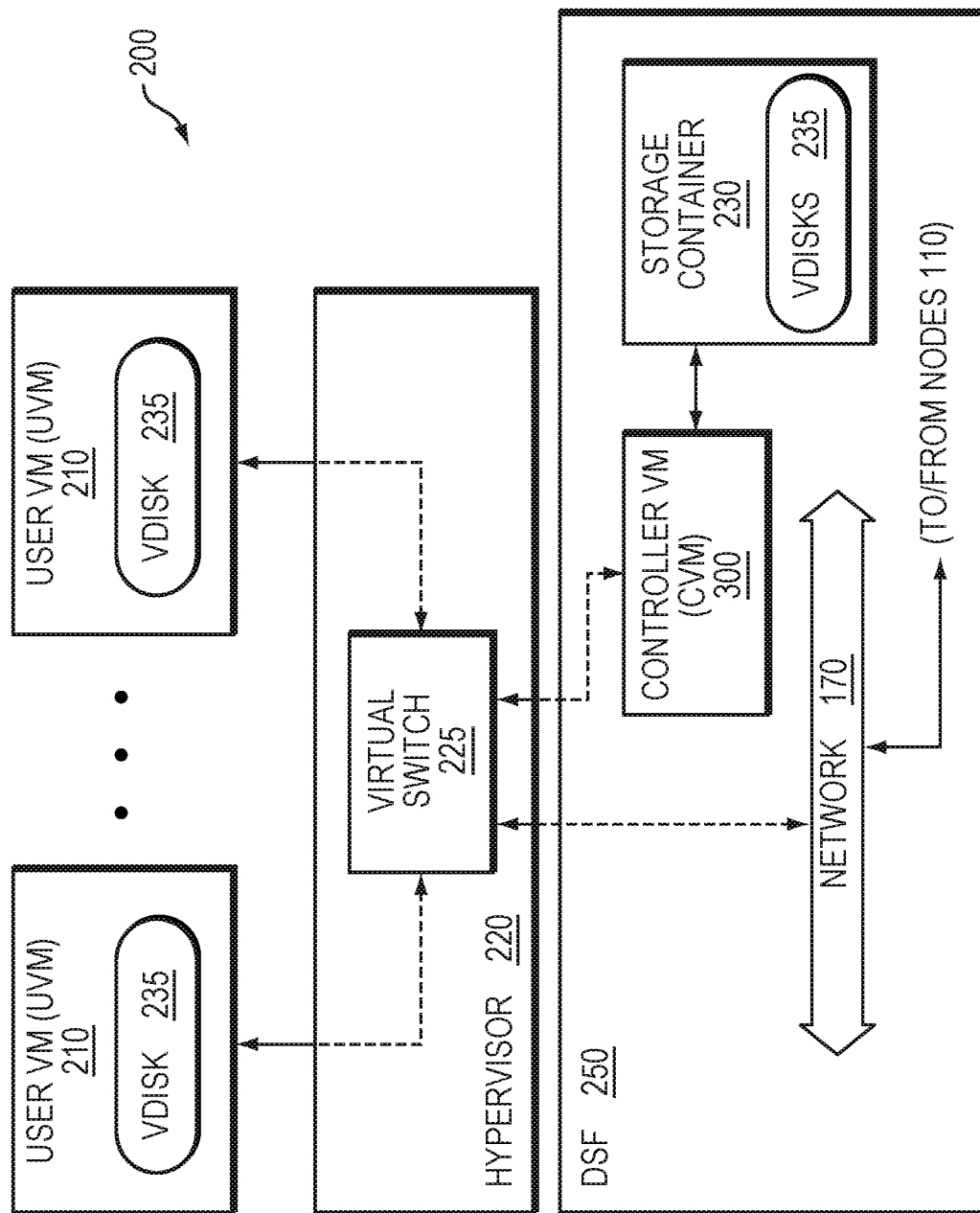
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AI-IV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyper-convergence architecture wherein the nodes provide both storage and computational resources available cluster wide.

The client software (e.g., applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CVM 300, which exports one or more iSCSI. CIFS, or NFS targets organized from the storage objects in the storage pool 160 of DSF 250 to appear as disks to the UVMs 210. These targets are virtualized, e.g., by software running on the CVMs. and exported as virtual disks (vdisks) 235 to the UVMs 210. In some embodiments, the vdisk is exposed via iSCSI. CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an iSCSI, CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the P-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably the IP-based storage protocol request packets may remain in the node 110 when the communication—the request and the response—begins and ends within the hypervisor 220. In other embodiments, the IP-based storage protocol request may be routed by the virtual switch 225 to a CVM 30) on another node of the same or different cluster for processing. Specifically, the IP-based storage protocol request may be forwarded by the virtual switch 225 to an intermediate station (not shown) for transmission over the network (e.g., WAN) to the other node. The virtual switch 225 within the hypervisor 220 on the other node then forwards the request to the CVM 300 on that node for further processing.

Figure 3:
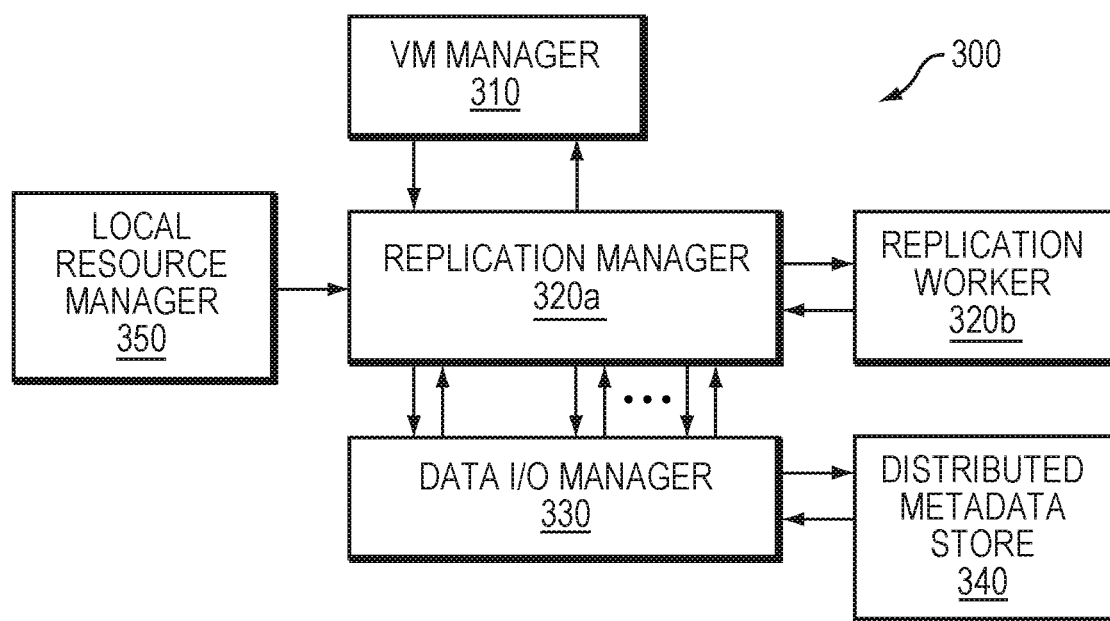
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic.

The CVM 300 may therefore be used in variety of different operating environments due to the broad interoperability of the industry standard IP-based storage protocols (e.g., iSCSI, CIFS, and NFS) supported by the CVM.

Illustratively, the CVM 300 includes a plurality of processes embodied as a storage stack that may be decomposed into a plurality of threads running in a user space of the operating system of the CVM to provide storage and I/O management services within DSF 250. In an embodiment, the user mode processes include a virtual machine (VM) manager 310 configured to manage creation, deletion, addition and removal of virtual machines (such as UVMs 210) on a node 110 of the cluster 100. For example, if a UVM fails or crashes, the VM manager 310 may spawn another UVM 210 on the node. A local resource manager 350 allows users (administrators) to monitor and manage resources of the cluster. In an embodiment, the resources may include generic resources (e.g., memory storage capacity and CPU processing capacity) and specialized resources (e.g., GPU types and/or models). A replication manager 320*a* is configured to provide replication and disaster recovery capabilities of DSF 250. Such capabilities include migration/failover of virtual machines and containers, as well as scheduling of snapshots. In an embodiment, the replication manager 320*a* may interact with one or more replication workers 320*b*. A data I/O manager 330 is responsible for all data management and I/O operations in DSF 250 and provides a main interface to/from the hypervisor 220, e.g., via the IP-based storage protocols. Illustratively, the data I/O manager 330 presents a vdisk 235 to the UVM 210 in order to service I/O access requests by the UVM to the DFS. A distributed metadata store 340 stores and manages all metadata in the node/cluster, including metadata structures that store metadata used to locate (map) the actual content of vdisks on the storage devices of the cluster.

Figure 4:
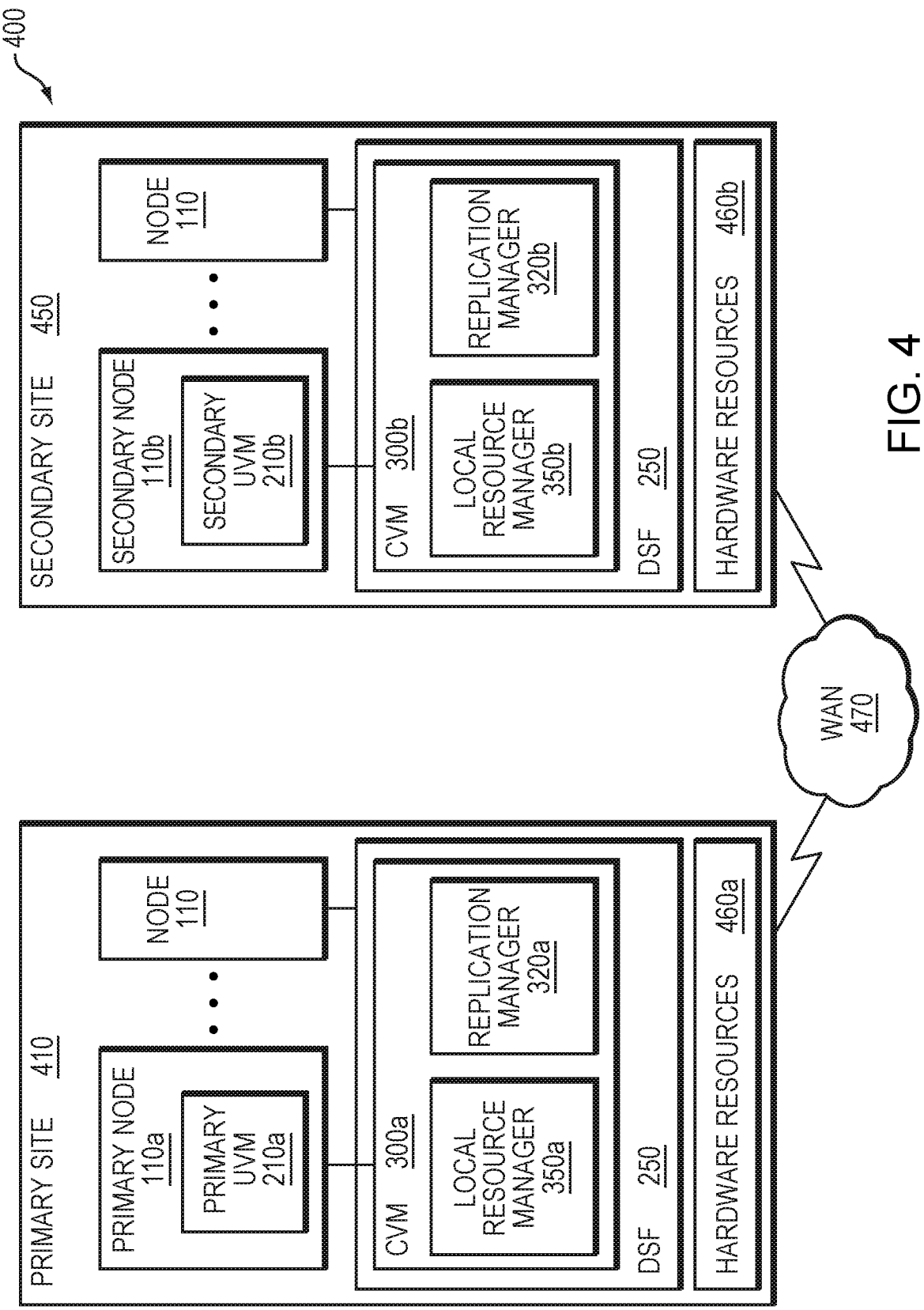
FIG. 4 is a block diagram of a disaster recovery environment configured to provide no loss failover of a virtual machine.

To prevent data loss and interruption of service in the event of a failure to one or more nodes of a cluster at a local geographic region, a virtual machine (such as a UVM) running on the failed node may be configured for failover to a failover node running at a remote geographic region in a disaster recovery environment. FIG. 4 is a block diagram of a disaster recovery (DR) environment configured to provide no loss failover of a virtual machine. A virtual machine (e.g., primary UVM 210*a*) running on a primary node 110*a* at local geographic region (i.e., a primary site 410) may be configured for failover and recovery to a secondary UVM 210*b* running on a secondary (failover) node 110*b* at remote geographic region (e.g., secondary site 450) in the DR environment 400. In an embodiment, the primary and secondary sites can be either on-premises (private) or cloud (public) sites. Local resource managers 350*a,b* and replication managers 320*a,b* of CVMs 300*a,b* running at both sites, respectively, cooperate to provide the failover and recovery of the primary UVM 210*a* in the event of failure to primary node 110*a*. However, no loss failover/recovery of the primary UVM 210*a* is only possible if the secondary node 110*b* at the secondary site 450 has sufficient resources to resume operations in the same configuration as the primary UVM 210*a*. More specifically, the secondary site 450 requires sufficient hardware resources 460*b* (e.g., CPU processing capability, GPU availability, etc.) to accommodate a configuration update of the primary 1*o* UVM 210*a* in the event of failover to secondary node 110*b*. Yet, administrators typically do not favor reservation of resources that are generally idle (not used), particularly for specialized hardware resources, such as GPUs.

The embodiments described herein are directed to a resource matching technique between a primary site and one or more secondary sites to accommodate a configuration update of a virtual machine in a DR environment. Specifically, the resource matching technique determines whether a proposed resource configuration update or change to the virtual machine (e.g., primary UVM 210a) running at the primary site 410 is permissible on secondary UVM 210b configured for failover (DR) operation according to the proposed updated resource configuration at the secondary sites 450b,c in the event that the primary UVM fails. To that end, the technique continuously monitors the availability of resources (e.g., hardware resources 460b) at each secondary site 450 as resource demand varies and enables negotiation between the primary and secondary sites of the proposed configuration change based on corresponding indications or capabilities of available resource that may vary unpredictably, e.g., according to dynamic load demand and local configuration changes. Illustratively, the hardware resources 460a,b may include generic resources (e.g., memory, storage capacity and CPU processing capacity) and specialized resources (e.g., GPU types and/or models).

In an embodiment, such site-to-site (i.e., peer-to-peer) resource availability monitoring may be extended to additional consideration associated with resource deployment in the event of DR failover such as (i) the type and criticality of the deployable resources at a site, (ii) rendering of decisions to deploy those resources, (iii) the dynamic nature of actual deployment of those resources; and/or (iv) the messaging protocol employed to convey resource utilization and availability at the sites so as to ascertain one or more sites suitable for failover. Notably the messaging protocol to convey (i.e., exchange) resource utilization and availability may occur on-demand (i.e., in response to a proposed VM configuration change) or at periodic intervals and may manifest as push or pull communications (i.e., sent without specific request or in response to a request).

Before implementing the proposed resource configuration change, the technique determines whether the proposed change (e.g., involving hardware resources 460a) to primary UVM 210a running at the primary site 410 is permissible on the secondary sites 450b,c (i.e., sufficient resources are available on a respective secondary site to support a failover of the VM). If and only if it is permissible for at least one secondary site, the proposed configuration change is allowed to take place. Otherwise, the proposed configuration change is temporarily suspended (i.e., provisionally rejected) along with a message indicating (suggesting) resource capabilities that each secondary site can support. Alternatively, the proposed configuration changes may be automatically retried at a next resource negotiation between the primary and secondary sites until the configuration change succeeds or is administratively removed.

For example, a proposed configuration change may involve assignment of the primary UVM 210a to a specialized resource, e.g., a particularly configured or profiled GPU 180, of the hardware resources 460a. The peer-to-peer resource monitoring may ensure that the particularly configured or profiled GPU 180 is included in an inventory of available hardware resources 460b at the secondary node 110b of the secondary site 450. However, such strict enforcement may not be possible due to cost/privilege reasons, e.g., an administrator desires protection of the primary UVM 210a (or secondary UVM 210b) to a public cloud wherein the required resources are currently not available but may be available on-demand at the time of DR failover as a cloud guarantee. In this case, the configuration change may be approved based on guarantees of resource availability at a time of DR failover rather than approved during inter-site negotiation of resource availability prior to DR failover. Further, override flags may be provided on a per-resource/configuration basis to obviate resource availability enforcement. In this embodiment, sufficient resources may need to be made available at the secondary sites to accommodate the DR failover if resources are oversubscribed. Notably, enforcement that the proposed configuration change is permissible on the secondary site(s) is performed continuously (e.g., at inter-site resource negotiation) and reservations over resources may be made at the secondary site so as to avoid oversubscription of those resources.

In an embodiment, the reservations may be migrated between secondary sites to accommodate resource (i.e., load) demand increases at some secondary sites versus others. That is, based on inter-site negotiated resource availability and utilization (e.g. exchange of resource capabilities messages), reservations may be migrated from busier secondary sites to more idle secondary sites while maintaining DR failover configuration requirements of the primary UVM. In this manner, failover reservations may be load balanced among a group of secondary sites. Alternatively, a warning may be indicated for the primary UVM when secondary site resources required for failover of that VM are discovered to be oversubscribed despite a previous approval of the configuration change to the primary UVM.

In another embodiment, the resource matching technique may be further directed to failover of a primary UVM 210a to a secondary UVM 210b at various geographical regions (sites) depending on availability of the required resources 460 to accommodate a configuration change to the primary UVM 210a. For example, a primary UVM (UVM-A) may be configured on primary site A for DR failover to a secondary UVM (VM-B) configured on secondary site B. Alternatively, another primary UVM (VM-B) may be configured on primary site B for DR failover to a secondary UVM (UVM-A) configured on secondary site A. In this embodiment, the various sites may be a mixture of private (on-premises) and public (in-cloud) sites. The technique thus enables a multi-site query for failover on a per UVM allocation basis that facilitates load-balancing of failover among the various sites depending on availability of resources.

Figure 5:
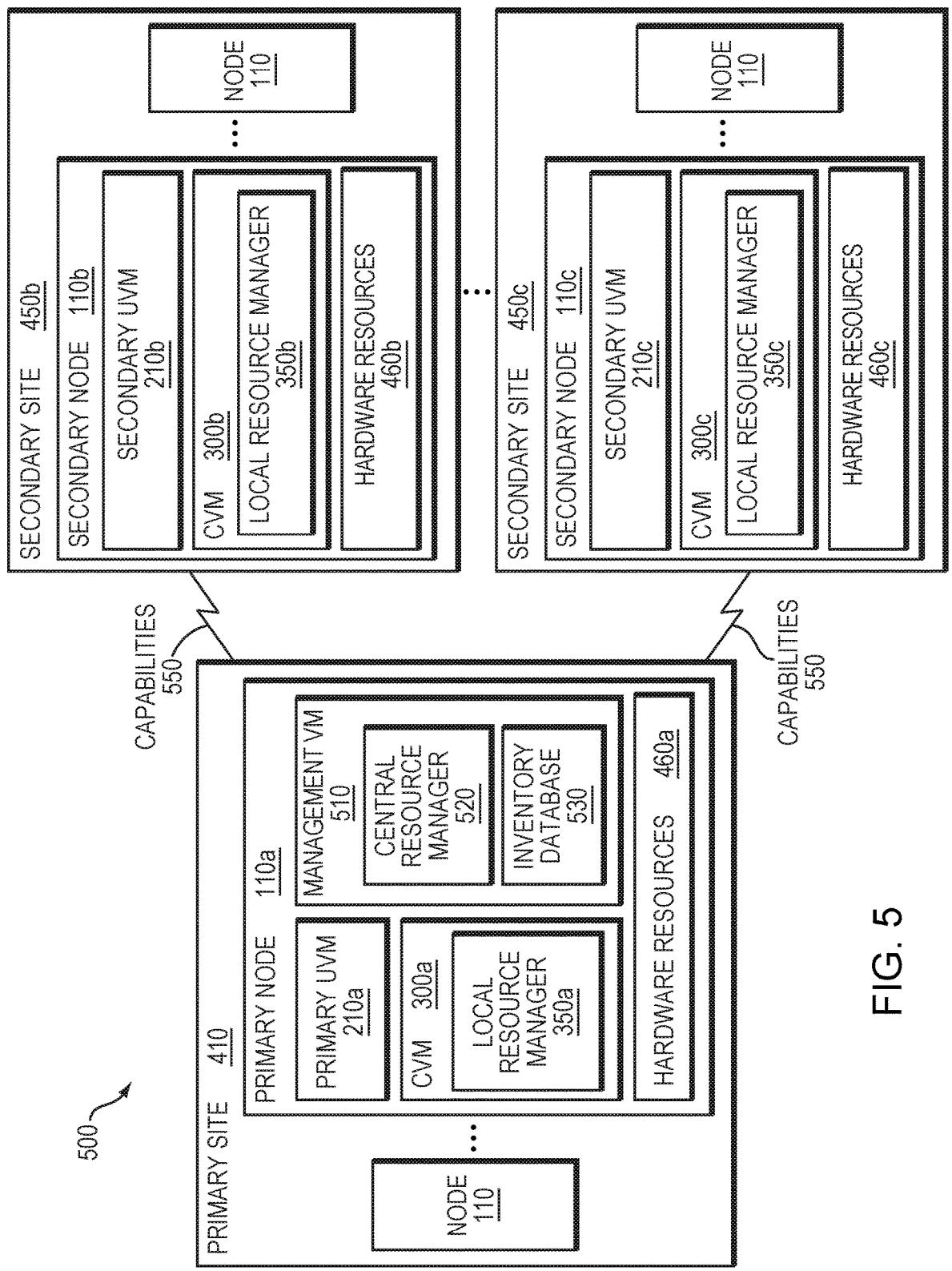
FIG. 5 is a block diagram illustrating a resource matching technique to accommodate a configuration update to the virtual machine in the disaster recovery environment.

FIG. 5 is a block diagram illustrating the resource matching technique to accommodate failover of a VM (UVM) in the DR environment. According to the technique, resource availability is determined by capabilities 550 provided to a central resource manager 520 by local resource managers 350a-c on the nodes of clusters at the primary site 410 and secondary sites 450b-c. Illustratively, the local resource manager 350a runs on CVM 300a of primary node 110a at the primary site 410, as well as on secondary nodes 110b-c of secondary sites 450b-c, and the central resource manager 520 runs on a management VM 510 of, e.g., the primary node 110a at the primary site 410. Note that the central resource manager 520 may run on a management VM 510 of any node at the primary and secondary sites. The capabilities 550 provided by the local resource managers 350a-c to the central resource manager 520 are directed to available hardware resources 460a-c at the primary and secondary sites.

When a proposed configuration change for one or more resources 460a is desired on the primary UVM 210a at the primary site 410, the technique determines whether a secondary site 450b-c has sufficient resources 460b-c to accommodate the proposed configuration change. For example, assume the proposed configuration change involves use of a specialized hardware resource, such as a particular type and/or model of GPU 180, for the primary UVM 210a. An inventory (manifest) of resources at each secondary site 450b-c is analyzed to determine the availability (if any) of the particular type and/or model of GPU 180 for use by a secondary UVM 210b-c at the secondary sites 450b-c. In an embodiment, if the resource is not available on a specific secondary site 450b-c selected (or at none of the secondary sites), the proposed configuration change for the primary UVM 210a at the primary site 410 is not allowed (denied). Moreover, if no specific secondary site is selected for the proposed change or the specific secondary site selected is unable to accommodate the proposed change, a message may be provided that indicates (suggests) (i) resource capabilities that each secondary site can support, or (ii) a list of alternative secondary sites determined to be able to accommodate the proposed change for the primary UVM 210.

The determination (e.g., a capability check) may be implemented via a messaging protocol (e.g., a capability protocol) illustratively embodied as representational state transfer (REST) and/or remote procedure call (RPC) application programming interfaces (APIs) implemented as HTTPS requests to update and retrieve the capabilities 550 (e.g., in JASON format) from nodes of the primary and secondary sites. In an embodiment, the central resource manager 520 may fetch the capabilities 550 from one or more secondary site(s) 450b-c and store the capabilities 550 as resource inventories on an inventory database 530. The central resource manager 550 may compare (validate) the inventories with a configuration specification of the primary site 410 for each proposed UVM configuration change. The central resource manager 520 may then provide the inventories to the local resource manager 350a of the primary site 410 along with a message (e.g., an operations failure message) indicating (suggesting) the resource capabilities that each secondary site 450b-c can support or a list of alternative secondary sites determined to be able to accommodate the proposed change for the primary UVM 210. In response, an administrator at the primary site 410 may adjust (tune) the proposed configuration accordingly. Alternatively, the proposed configuration changes may be automatically retried at a next resource negotiation between the primary and secondary sites until the proposed configuration change succeeds (due to load change reducing resource demand at the secondary sites) or is administratively removed.

In essence, the technique is directed to negotiation among local resource managers 350a-c running on nodes at the primary site 410 and secondary sites 450b-c to determine available resources in a DR environment. The negotiation occurs when a configuration change is proposed for a UVM at the primary site 410 and a determination is rendered as to which (if any) secondary site 450b-c has currently available resources 460b-c to accommodate the configuration change. However, the technique may be extended to allow the local resource manager 350b-c of each secondary site 450b-c to report availability of resources dynamically, i.e., as inventories of available hardware resources 460b-c change at the secondary site 450b-c. In essence, the negotiation involves a "pull" configuration change inquiry where the local resource manager 350a at the primary site 410 drives the exchange in response to a proposed configuration change to the primary UVM 210a, as well as a "push" configuration change update where a local resource manager 350b-c at a secondary sites 450b-c drives the exchange in response to a change of available resources 460b-c at the secondary site.

In an embodiment, a configuration change flag may be asserted, e.g., in a configuration file stored on primary node 110a at primary site 410, which requires checking for availability of resources 460b-c at the secondary site 450b-c before deploying the proposed configuration change for the primary UVM 210b. In response to the check, an administrator of the secondary site 450b-c may change the configuration of resources available for the secondary UVM 210b-c to increase or add the proposed resource 460 b-c on the secondary site. Alternatively, the administrator may be presented 1o with (i) a current inventory of available hardware resources 460b-c as a "suggestion" to a configuration change of the primary UVM 210a that can be supported at the secondary site 450b-c; (ii) a different secondary site able to accommodate the configuration change; or (iii) automatic retry for a number of times or for a specific time interval until the configuration succeeds (e.g., attempt to approve configuration change for next 6 hrs. to secondary site 450b).

In addition, the technique includes status reporting for the administrator, e.g., via a graphical user interface (GUI), as to whether generic/specialized hardware resources 460b-c are available at the secondary sites 450b-c to accommodate a proposed configuration change of a primary UVM 210a at the primary site 410. The status report may include the suggestion as to resource availability on the secondary site to enable dynamic (interactive) changes to a proposed configuration of the primary UVM 210a based on resource availability at the secondary site 450b-c. As noted, the configuration resource change to the primary UVM 210a may be denied if the resource is not available at the secondary site. Such denial may prove problematic in the event of a disaster at the primary site that shuts down the primary UVM, since an objective of DR failover is to immediately power-up a backup (secondary) UVM 210b-c having sufficient resources to resume failover operation from the primary UVM 210a.

Accordingly, the resource matching technique further provides for complete reservation of a hardware resource 460b-c at the secondary site 450b-c to accommodate a proposed configuration change to a primary UVM 210a at the primary site 410. However, such complete resource reservation may be costly and, thus, undesirable. In an embodiment, the technique may include partial reservation of a resource 460b-c depending upon categories of UVMs (e.g., critical or non-critical), wherein the resource may be reserved for a critical UVM, but not reserved for a non-critical UVM. That is, the hardware resource 460b-c is reserved at the secondary site 450b-c for a critical primary UVM running at the primary site 410 and available for immediate powering of a secondary UVM 210b-c running at the secondary site 450b-c in the event of a disaster at the primary site. Yet, the resource is not available on the secondary site 450b-c for a non-critical primary UVM and, in the event of the disaster, a secondary UVM 210b-c cannot be powered up for failover operation of that primary UVM.

In an embodiment, the reservations may be migrated between secondary sites to accommodate resource (i.e., load) demand increases at some secondary sites versus others. That is, based on inter-site negotiated resource availability and utilization (e.g. exchange of resource capabilities messages), reservations may be migrated from busier secondary sites to more idle secondary sites while maintaining DR failover configuration requirements of the primary VM. In this manner, failover reservations may be load balanced among a group of secondary sites. Alternatively, a warning may be indicated for the primary VM when secondary site resources required for failover of that VM are discovered to be oversubscribed despite a previous approval of the configuration change to the primary VM.

Advantageously, the resource matching technique enables no loss failover and recovery of a primary VM at a primary site to a secondary VM at a secondary site by ensuring availability of resources deployed at the secondary site to accommodate a configuration update to the primary VM. Unlike previous attempts at no loss failover that consider memory, storage and CPU headroom requirements to achieve a "best-effort" failover node/site configuration, the technique described herein considers resource availability and deployment for each proposed configuration change to the primary VM.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A non-transitory computer readable medium including program instructions for execution on a processor, the program instructions configured to:
   receive a proposed configuration change for a virtual machine (VM) of a node at a first site, the proposed configuration change including a resource configuration change and an association of the VM with recovery to a second site in an event of failover;
   request capabilities for resources of the second site; and
   in response to determining that the resource capabilities of the second site are insufficient to accommodate failover of the VM to the second site that includes the proposed configuration change, suspend the proposed configuration change for the VM at the first site until the proposed configuration change is retried after being chased or after a time interval occurs.

2. The non-transitory computer readable medium of claim 1 including program instructions further configured to:
   request capabilities for resources of a third site; and
   in response to determining that the resource capabilities of the third site are sufficient to accommodate failover of the VM to the third site that includes the proposed configuration change, indicate at the first site that the third site can accommodate the proposed configuration change and apply the proposed configuration change to the VM at the first site, wherein the association of the VM with recovery to the second site of the proposed configuration change is changed to the third site.

3. The non-transitory computer readable medium of claim 1, wherein the request for capabilities is pushed to the first site periodically.

4. The non-transitory computer readable medium of claim 1, wherein the resource configuration change includes resources identifying a model of a graphics processing unit.

5. The non-transitory computer readable medium of claim 1, wherein the program instructions include instructions further configured to:
   in response to determining that an override flag is set for a resource included in the proposed configuration change, exclude the resource from the determination that the resource capabilities of the second site are insufficient to accommodate failover of the VM to the second site that includes the proposed configuration change.

6. The non-transitory computer readable medium of claim 1 wherein the program instructions configured to suspend the proposed configuration change for the VM include program instructions further configured to:
   re-request capabilities for the resources of the second site; and
   in response to determining that the re-requested resource capabilities of the second site are sufficient to accommodate failover of the VM to the second site that includes the proposed configuration change, apply the proposed configuration change to the VM at the first site.

7. The non-transitory computer readable medium of claim 1 wherein the program instructions configured to suspend the proposed configuration change for the VM include program instructions further configured to:
   suggest the capabilities of the second site that can be used to support a changed proposed configuration change for the VM.

8. A non-transitory computer readable medium including program instructions for execution on a processor, the program instructions configured to:
   receive a proposed configuration change for a virtual machine (VM) of a node at a first site, the proposed configuration change including an association of the VM with recovery to a second site in an event of failover;
   request capabilities for resources of the second site; and
   in response to determining that the resource capabilities of the second site are insufficient to accommodate failover of the VM to the second site that includes the proposed configuration change, reserve resources at the second site associated with the proposed configuration change and apply the proposed configuration change to the VM at the first site.

9. The non-transitory computer readable medium of claim 8 wherein the program instructions include instructions further configured to:
   re-request capabilities of the second site including a first utilization;
   request capabilities of a third site including a second utilization; and
   migrate the reservation of resources from the second site to the third site in response to the second utilization being lower than the first utilization.

10. A method comprising:
    receiving a proposed configuration change for a virtual machine (VM) of a node at a first site, the proposed configuration change including an association of the VM with recovery to a second site in an event of failover;
    requesting capabilities for resources of the second site; and
    in response to determining that the resource capabilities of the second site are insufficient to accommodate failover of the VM to the second site that includes the proposed configuration change, suspending the proposed configuration change for the VM at the first site until the proposed configuration change is retried after being changed or after a time interval occurs.

11. The method of claim 10 further comprising:
requesting capabilities for resources of a third site; and
in response to determining that the resource capabilities of the third site are sufficient to accommodate failover of the VM to the third site that includes the proposed configuration change, indicating at the first site that the third site can accommodate the proposed configuration change and apply the proposed configuration change to the VM at the first site, wherein the association of the VM with recovery to the second site of the proposed configuration change is changed to the third site.

12. The method of claim 10, wherein requesting capabilities for resources further comprises pushing the capabilities to the first site periodically.

13. The method of claim 10 wherein the proposed configuration change includes resources identifying a model of a graphics processing unit.

14. The method of claim 10 further comprising:
in response to determining that an override flag is set for a resource included in the proposed configuration change, excluding the resource from the determination that the resource capabilities of the second site are insufficient to accommodate failover of the VM to the second site that includes the proposed configuration change.

15. The method of claim 10 wherein suspending the proposed configuration change for the VM further comprises:
re-requesting capabilities for the resources of the second site; and
in response to determining that the re-requested resource capabilities of the second site are sufficient to accommodate failover of the VM to the second site that includes the proposed configuration change, approving the proposed configuration change for the VM.

16. The method of claim 10 wherein the proposed configuration change for the VM further comprises: suggesting the capabilities of the second site that can be used to support another proposed configuration change for the VM.

17. A method comprising:
receiving a proposed configuration change for a virtual machine (VM) of a node at a first site, the proposed configuration change including an association of the VM with recovery to a second site in an event of failover;
requesting capabilities for resources of the second site; and
in response to determining that the resource capabilities of the second site are insufficient to accommodate failover of the VM to the second site that includes the proposed configuration change, reserving resources at the second site associated with the proposed configuration change and apply the proposed configuration change to the VM at the first site.

18. The method of claim 17 further comprising:
re-requesting capabilities of the second site including a first utilization;
requesting capabilities of a third site including a second utilization; and
migrating the reservation of resources from the second site to the third site in response to the second utilization being lower than the first utilization.

19. An apparatus comprising:
a cluster of nodes each having a processor and storage; and
a network interconnecting the nodes, wherein the processors of the nodes are configured to:
receive a proposed configuration change for a virtual machine (VM) of a node at a first site, the proposed configuration change including an association of the VM with recovery to a second site in an event of failover;
request capabilities for resources of the second site; and
in response to determining that the resource capabilities of the second site are insufficient to accommodate failover of the VM to the second site that includes the proposed configuration change, suspend the proposed configuration change for the VM at the first site until the proposed configuration change is retried after being changed or after a time interval occurs.

20. The apparatus of claim 19, wherein the processors of the nodes are further configured to:
request capabilities for resources of a third site; and
in response to determining that the resource capabilities of the third site are sufficient to accommodate failover of the VM to the third site that includes the proposed configuration change, indicate at the first site that the third site can accommodate the proposed configuration change and apply the proposed configuration change to the VM at the first site.

21. The apparatus of claim 19, wherein the request for capabilities is pushed to the first site periodically.

22. The apparatus of claim 19, wherein the proposed configuration change includes resources identifying a model of a graphics processing unit.

23. The apparatus of claim 19, wherein the processors of the nodes are further configured to:
in response to determining that an override flag is set for a resource included in the proposed configuration change, exclude the resource from the determination that the resource capabilities of the second site are insufficient to accommodate failover of the VM to the second site that includes the proposed configuration change.

24. The apparatus of claim 19, wherein the processors of the nodes configured to suspend the proposed configuration change for the VM are further configured to:
re-request capabilities for the resources of the second site; and
in response to determining that the re-requested resource capabilities of the second site are sufficient to accommodate failover of the VM to the second site that includes the proposed configuration change, apply the proposed configuration change to the VM at the first site.

25. The apparatus of claim 19, wherein the processors of the nodes configured to suspend the proposed configuration change to the VM are further configured to:
suggest the capabilities of the second site that can be used to support a changed proposed configuration change for the VM.

26. An apparatus comprising:
a cluster of nodes each having a processor and storage; and
a network interconnecting the nodes, wherein the processors of the nodes are configured to:
receive a proposed configuration change for a virtual machine (VM) of a node at a first site, the proposed configuration change including an association of the VM with recovery to a second site in event of failover;
request capabilities for resources of the second site; and
in response to determining that the resource capabilities of the second site are insufficient to accommodate failover of the VM to the second site that includes the proposed configuration change, reserve resources at the second site associated with the proposed configuration change and apply the proposed configuration change to the VM at the first site.

27. The apparatus of claim 26, wherein the processors of the nodes are further configured to:
   re-request capabilities of the second site including a first utilization;
   request capabilities of a third site including a second utilization; and
   migrate the reservation of resources from the second site to the third site in response to the second utilization being lower than the first utilization.

28. A non-transitory computer readable medium including program instructions for execution on a processor, the program instructions configured to:
   receive a proposed configuration change for a virtual machine (VM) of a node at a primary site, the proposed configuration change including a resource configuration;
   request capabilities for resources of a plurality of secondary sites; and
   in response to determining that the resource capabilities of at least one of the secondary sites is sufficient to accommodate failover of the VM that includes the proposed configuration change, apply the proposed configuration change to the VM at the first site.

29. The non-transitory computer readable medium of claim 28, wherein the program instructions, in response to determining that the resource capabilities of at least one of secondary sites is sufficient to accommodate failover of the VM, are further configured to reserve resources associated with the proposed configuration change at the determined one of the sufficiently-resource capable secondary sites.

30. The non-transitory computer readable medium of claim 29 including program instructions further configured to:
   re-request capabilities of the determined one of the sufficiently-resourced secondary sites, wherein the re-requested capabilities include a first utilization;
   request capabilities of another one of the sufficiently-resourced secondary sites, wherein the requested capabilities include a second utilization; and
   migrate the reservation of resources from the determined one of the sufficiently-resourced secondary sites to the another one of the sufficiently-resourced secondary sites in response to the second utilization being lower than the first utilization.

31. The non-transitory computer readable medium of claim 28 wherein the program instructions in response to determining that the resource capabilities of at least one of secondary sites is sufficient to accommodate failover of the VM, are further configured to associate the proposed configuration of the VM with recovery to the determined one of the sufficiently-resourced secondary sites.

32. The non-transitory computer readable medium of claim 28, wherein the program instructions in response to determining that the resource capabilities of at least one of secondary sites is sufficient to accommodate failover of the VM, are further configured to not reserve resources associated with the proposed configuration change at the determined one of the sufficiently-resourced secondary sites when the VM is categorized as non-critical.

33. A non-transitory computer readable medium including program instructions for execution on a processor, the program instructions configured to:
   receive a proposed configuration change for a virtual machine (VM) at a primary site, the proposed configuration change including a resource configuration change and an association of the VM with recovery to a secondary site in an event of failover;
   request capabilities for resources of the secondary site and of a third site; and
   in response to determining that the resource capabilities of the second site and the third site are insufficient to accommodate failover of the VM to the second site that includes the proposed configuration change, suspend the proposed configuration change for the VM at the first site until the proposed configuration change is retried after being changed or after a time interval occurs.

34. The non-transitory computer readable medium of claim 33 including program instructions further configured to:
   re-request capabilities for resources of the third site; and
   in response to determining that the resource capabilities of the third site are sufficient to accommodate failover of the VM to the third site that includes the proposed configuration change, indicate at the first site that the third site can accommodate the proposed configuration change and apply the proposed configuration change to the VM at the first site, wherein the association of the VM with recovery to the second site of the proposed configuration change is changed to the third site.

35. The non-transitory computer readable medium of claim 33, wherein the request for capabilities is pushed to the first site periodically.

36. The non-transitory computer readable medium of claim 33, wherein the resource configuration change includes resources identifying a model of a graphics processing unit.

37. The non-transitory computer readable medium of claim 33, wherein the program instructions include instructions further configured to:
   in response to determining that an override flag is set for a resource included in the proposed configuration change, exclude the resource from the determination that the resource capabilities of the second site are insufficient to accommodate failover of the VM to the second site that includes the proposed configuration change.

38. The non-transitory computer readable medium of claim 33 wherein the program instructions configured to suspend the proposed configuration change for the VM include program instructions further configured to:
   re-request capabilities for the resources of the second site; and
   in response to determining that the re-requested resource capabilities of the second site are sufficient to accommodate failover of the VM to the second site that includes the proposed configuration change, apply the proposed configuration change to the VM at the first site and when the VM is categorized as critical, reserve resources at the second site associated with the proposed configuration change.

39. The non-transitory computer readable medium of claim 33 wherein the program instructions configured to suspend the proposed configuration change to the VM include program instructions further configured to:
   suggest the capabilities of the second and third sites that can be used to support a changed proposed configuration change for the VM.

* * * * *